July 17, 1951

B. O. BURRITT 2,560,758

SPEED RESPONSIVE PRESSURE FLUID SERVOMOTOR

Filed Dec. 3, 1943

INVENTOR.
BURNELL O. BURRITT
BY
George M. Soule
ATTORNEY

INVENTOR.
BURNELL O. BURRITT
BY
George M. Soule
ATTORNEY

July 17, 1951  B. O. BURRITT  2,560,758
SPEED RESPONSIVE PRESSURE FLUID SERVOMOTOR
Filed Dec. 3, 1943  5 Sheets-Sheet 3

INVENTOR.
BURNELL O. BURRITT
BY
George M. South
ATTORNEY

INVENTOR.
BURNELL O. BURRITT
BY
George M. Soule
ATTORNEY

Patented July 17, 1951

2,560,758

UNITED STATES PATENT OFFICE 2,560,758

SPEED RESPONSIVE PRESSURE FLUID SERVOMOTOR

Burnell O. Burritt, Euclid, Ohio, assignor to The Marquette Metal Products Company, Cleveland, Ohio, a corporation of Ohio Application December 3, 1943, Serial No. 512,731

3 Claims. (Cl. 121—42)

This invention relates to governors for prime movers and other machinery and more particularly to a governor unit of compact form having all the neecssary control and regulation features necessary for accurate governing of Diesel engines and other types of prime movers. The above indicates one object hereof.

Compensation is required in speed governors for damping transitory phenomena accompanying and immediately following speed change. The present improvement involves what is known in isochronous governing as primary and secondary compensation, primary compensation being a restraining force on the speed weighing or control element of the governor during movement of said element in effecting speed correction through means such as a speed regulating servomotor, and secondary compensation being the removal of that restraint as the speed correction is accomplished.

An object is to provide a speed governor compensating system which will prevent over-compensation during large load changes while enabling adequate compensation for prompt speed stabilization during small load changes, or, in other words, to provide a speed governor in which compensation is correctly balanced for all load changes that are likely to occur.

A further specific object is to provide, in a hydraulic relay governor having a hydraulically operating compensation system, an improved mechanism for controlling and/or adjusting the amount of compensation fluid caused to become effective as a result of speed regulating servomotor movement.

A further object is to provide a governor having an improved pressure-differential-operated speed regulating servomotor.

A specific object is to provide a governor having a speed regulating servomotor in which (a) oppositely acting pressure-differential-operated pistons are contained in parallel bores of a single governor case section and so connected to a regulating rock shaft that all working clearances in the rock shaft connections are taken up automatically upon application of fluid pressure to the piston and (b) wherein a regulating or terminal shaft is contained in a governor casing section separate from that containing the servomotor piston arrangement and having automatically established connections with the piston mechanism upon assembly of the two casing sections, whereby to obviate the necessity of using connecting pins or fastening members for assembly and disassembly.

A further object is to provide an improved mechanism for enabling the governed machine to operate with adjustable degrees of speed droop as for paralleling adjustment of engines operating on a common load.

Another object is to provide a simple and effective means for performing various adjustments in respect to compensation of the governor mechanism during load change.

Still another object is to provide an improved speed adjusting mechanism which includes a speeder spring acting to resist centrifugal force on a set of fly balls or equivalent speed responsive means.

A further object is to provide an improved and simplified automatic load limit control mechanism and adjusting means therefor.

A further object is to provide an improved means for connecting a speeder spring of a governor to a supporting means for the spring between a speed setting mechanism and pilot valve.

Other objects and features of the invention will become apparent from the following description. In the drawings.

Figure 1:
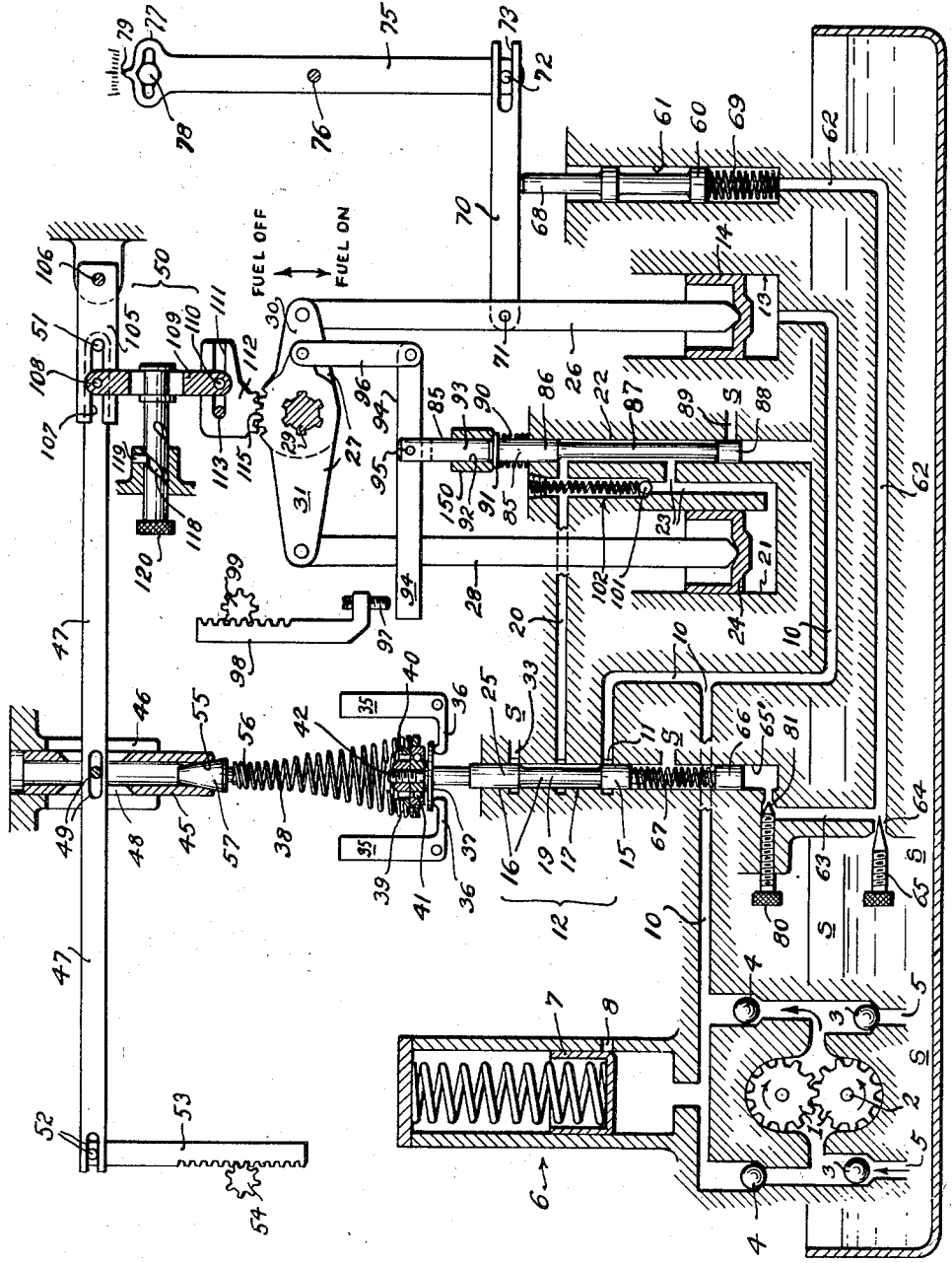
Fig. 1 is a schematic or diagrammatic view of the principal elements of the governor mechanism.

A somewhat better understanding of the mechanism as a whole may be had from consideration of the schematic view Fig. 1 wherein a hydraulic relay governor mechanism is shown. Said mechanism has a self-contained fluid pump 1 comprising mating gears in a suitable pump case, one of which gears is driven for example by a shaft 2 (cf. Fig. 3) constituting the main drive shaft for the governor. The pump has a reversible arrangement of inlet and outlet valves, the elements of which are indicated at 3 and 4 whereby fluid is drawn as through inlet ducts 5 communicating with a sump S and delivered to an accumulator 6 having a spring biased plunger 7 and discharge vent 8 leading to the sump. Constant or nearly constant pressure is thereby maintained in a duct 10 which is in open communication at all times with a control port 11 of a control pilot valve mechanism, generally indicated at 12. Additionally, the duct 10 leads to a power cylinder 13 of a speed regulating servomotor where such constant pressure is applied against a piston 14 slidable in said cylinder.

The fluid from the accumulator is controlled at the port 11 by a lower plug element 15 of a pilot valve plunger 16 slidable in a valve bore 17. When the plug portion 15 of the pilot valve plunger is lowered from the neutral position in which the plunger is shown, the constant pressure fluid is admitted to a regulation fluid duct 20 past a neck portion 19 of the pilot valve plunger. The duct 20 communicates with a servomotor power cylinder 21 through a vertical valve bore 22 having a branch at 23 in open communication with the lower end of the cylinder 21 so that fluid is applied against the lower side of a piston or plunger 24. The power pistons 14 and 24 as shown are of the same size but, in order that they may operate as differential pistons, the two are connected through push rods 26 and 28 with a rocker lever assembly 27 constituted by arms of unequal length extending on opposite sides of a fuel regulating terminal shaft 29 supported for turning movement in fixed position. For example, the effective lever arms may be in 1:2 ratio, the shorter arm 30 being connected to the push rod 26 and the longer arm 31 to the push rod 28.

When the pilot valve plunger 16 moves downwardly from the neutral position in which it is shown in order to supply fluid to the cylinder 21 the piston 24 moves upwardly due to its longer lever arm connection with the output shaft 29, thus forcing the piston 14 downwardly against the continually applied opposing pressure from the duct 10. When the pilot valve plunger 16 moves upwardly from said neutral position an upper plug portion 25 beyond the neck 19 uncovers a port 33 which is in open communication with the sump so that fluid from the power cylinder 21 and duct 20 is vented to sump causing the power piston 24 to move downwardly as a result of continued application of pressure to the piston 14. During such upward movement of the pilot valve plunger 16, the port 11 controlled by the plug 15 remains sealed.

In the particular arrangement shown, clockwise movement of the regulator shaft 29 of the servomotor will cause an increase of power input, e. g. fuel, to the engine whereas a counterclockwise movement effects a decrease in input or fuel. The pilot valve plunger 16 is urged upwardly by speed responsive mechanism shown in the form of fly ball levers 35 having arms 36 bearing upwardly against a thrust plate 37 fixed to the upper end of the pilot valve plunger. The fly balls may be driven, for example, by the pump operating shaft 2 in a manner to be described later herein.

Outward movement of the fly balls 35 and upward movement of the pilot valve plunger are resisted by the downward force of a coiled speeder spring 38 at the top end of the pilot valve plunger assembly. The spring has its lower end portion 39 secured to a supporting ring 40 carrying the outer element of an antifriction bearing assembly 41, the inner race element of which assembly is fastened rigidly to the reduced upper end 42 of the pilot valve plunger beyond the thrust plate 37. That arrangement enables the rotating fly balls to turn the pilot valve plunger continually in the valve bore 17 during operation of the governor. The pilot valve plunger 16 is held normally in the neutral position in which illustrated because the effective force of the fly balls balances a pre-set loading on the speeder spring 38. Changes in load on the engine cause changes in speed of the fly balls hence upward or downward movement of the valve plunger as usual in hydraulic relay governors.

Adjustment of speed is effected by a speeder plug arrangement including a sleeve 45 slidable in a fixed guide 46 and a lever 47 extending through apertures 48 in the sleeve 45 and pivotally attached to the sleeve at a pin and slot coupling 49. For enabling speed droop adjustment of the governor the lever 47 may be operated at one end for slight raising and lowering movement by a speed droop adjusting mechanism indicated generally at 50 but, for the moment, the right hand end of the lever 47 may be considered to have a fixed pivot at 51 so that equal increments of raising and lowering movement of the left hand end of the lever will correspondingly change the compressive force on the speeder spring and thereby change the speed at which the engine is set to operate. The left hand end of the lever has a pin and slot connection at 52 with a rack 53 in a suitable guide and in constant mesh with an operating pinion 54 subject to manual or motor adjustment as desired.

The lower end of the sleeve 45 as shown has a conical inner surface 55 and the top end of the speeder spring is threaded as at 56 to the lower end of a conical block 57 which seats against the surface 55 with sufficient force normally to maintain a tight connection by reason of the angle of taper. The angle, for example, may be 28° as used on collets. The cone surface connection enables the mechanism associated with the lever 47 to be readily separated from the assembly constituted by the speeder spring, block 57 and the pilot valve plunger and readily replaced thereon in operating position.

The governor in one position of adjustment of the speed droop control mechanism 50 functions to effect isochronous control of the engine (zero speed droop). Primary compensating force for speed stabilization during isochronous operation is applied to the lower end of the pilot valve plunger 16 hydraulically as a function of servomotor movement. The hydraulic compensation system is separate from the pressure system heretofore described although it is supplied with fluid from the same sump source. As shown, an actuating compensation piston 60 is shown at the right of the diagram slidable in a bore 61 which serves as the actuating compensation cylinder by communication at its lower end with a compensation fluid duct 62. Said duct has a portion 63 beyond an adjustable compensating vent/inlet aperture 64 governed by a needle valve screw 65 in the usual manner and the duct portions 63 leads to a receiving compensation fluid chamber or cylinder 65' below the pilot valve plunger. A receiving compensation piston 66 slides in said bore 65' and is coupled with the lower end of the pilot valve plunger as by a coil spring 67 tightly threaded at its opposite ends on the piston 66 and the lower plug portion 15 of the pilot valve 16 respectively.

Drop in load on the engine resulting in increased speed of the fly balls raises the pilot valve plunger thereby initiating a fuel decreasing movement of the servomotor by virtue of venting fluid from below the power piston 24. The actuating compensation piston 60 has a stem 68 normally held in contact as by a spring 69 below the piston 60 with a lever 70 attached at one end as by pivot pin 71 to the connecting rod 26 of the power piston 14. The opposite end of the lever 70 normally has a variable fulcrum constituted by a pin 72 slidably fitting a slot 73 in the lever 70. Thus the upward movement of the connecting rod 26 resulting in decreased input or fuel supply to the engine allows the spring 69 to raise the actuating compensation piston 60 and place a suction force on the duct 62, 63 and thereby on the lower face of the receiving compensation piston 66. That action through the spring 67 yieldably checks the upward movement of the pilot valve plunger for speed stabilization as well understood at date hereof. The suction force on the duct 62, 63, as the prime mover speed is restored to its set value, is relieved through the aperture 64 past the pointed end of the needle valve screw 65. The average rate of leakage at the aperture 64, as controlled by adjustment of the screw 65, is determined principally by the rate of response on part of the engine to the regulating control impulses, thus being different for engines having different response characteristics.

Upon an increase of load the system operates substantially the reverse of the manner just described for, in that case, the fly balls are moved inwardly by the speeder spring, the pilot valve plunger is lowered and more fluid from the constant pressure supply is fed to the servomotor cylinder 21 for upward (fuel increasing) movement of the piston 24 accompanied by downward movement of the piston 14. During such fuel increasing movement of the servomotor compensation is effected by lowering movement of the actuating compensation piston 60 and an upward movement of the receiving compensation piston 66 tending to urge the pilot valve plunger upwardly through the intermediary of the connecting spring 67. As stabilization in speed is effected, the temporary pressure of fluid in the compensation system is relieved through the vent/inlet aperture 64.

Ordinarily, the amount of suction and rise in pressure on the compensation fluid for speed stabilization can be fixed once the rate of response of the engine to regulating impulses is determined. However, since some engines respond rapidly and some slowly and various amounts of servo travel are used, it is desirable to be able to adjust the effective delivery capacity of the actuating compensation mechanism and this is done by movement of the pin 72 in the slot 73 of the lever 70. The pin 72 is carried on the lower end of a lever 75 having a fixed pivot at 76 in a speeder case portion of the governor (to be described presently) so that movement to the right or left on part of the upper slotted end 77 of the lever will adjust the position of the normally fixed pin 72. As shown, a clamping screw 78 passes through the slot at the upper end 77 of the lever; and said upper end, by reason of a pointer 79 and associated indicia on the governor case, functions to indicate in a general way the amount of compensation fluid displaced during average regulating impulses of the servomotor.

Irrespective of adjustment in volume of compensation fluid moved at each regulating impulse and irrespective of secondary or restoring compensation adjustment, the tendency is for hydraulic relay governors to return the speed of the engine to normal less promptly consequent to imposition of large load changes than consequent to imposition of small load changes.

Assuming the compensation system does not include any restriction such as indicated at 81 (described below) the volume of compensation fluid displaced by the actuating piston 60 at a given setting of the actuating compensation stroke adjusting fulcrum 72 would be proportional to the amount of speed (and load) change because the servomotor has to move farther in making corrections for large changes than it does in correcting for small changes and consequently the actuating compensation piston pumps more fluid in the first instance. A greater restraining (primary compensation) force is imposed on the pilot valve during large changes because, due to the yieldability of the receiving compensation piston 66 relative to the pilot valve, the rate of dissipation of the primary compensating force through the intermediary of the secondary compensating vent/inlet aperture 64 is about the same in the two cases. Now since excessive restraint on the pilot valve (too much primary compensation) obviously will result in a sluggish or inching movement of the servomotor in the speed correcting direction (due to the fact that the compensating restraint is ordinarily applied immediately or with insignificant delay upon any movement of the servomotor) the imposition of primary compensating force on the pilot valve proportionate to the movement of the servomotor is disadvantageous if the load change, hence speed departure, is considerable. The force or at least the initial force should be less in such case in order to secure prompt and continued action on part of the servomotor in the speed correcting direction. On the other hand imposition of compensating force on the pilot valve as nearly proportionate as possible to the amplitude of movement of the servomotor is ideal if the load change, hence speed departure, is relatively small, for then, in order to be effective to damp the speed oscillation (minimize hunting) the compensation displacement must be at least slightly more than the leak-off capacity of the secondary compensation vent/inlet, and there is only an infinitesimal time period in which to build up the necessary pressure or suction. In the present governor the ordinary compensation system and its operation are so modified that enough compensation is obtainable for damping out undesirable oscillation during large and small changes but in case of large changes, the compensating restraint on the pilot valve is, in effect, delayed so that prompt corrective regulating operation takes place.

The compensation modifier hereof, in the particular form shown, is a restriction between the compensation fluid duct 63 and the receiving compensation cylinder 65'. Such restriction, as shown in Fig. 1, is provided with an adjusting valve screw 80 which can be set in reference to an orifice or passage 81 connecting said duct portion and receiving compensation cylinder so that during a large load change, upon which the servomotor moves a considerable distance, a greater proportion of the compensating fluid will be forced idly through the vent/inlet aperture 64 than during a smaller change. During such smaller changes a large proportion of the displaced compensation fluid passes the modifier restriction at 81 as though the same were not present in the system. Thus over-compensation is prevented for large changes while nevertheless the compensation is or can be adjusted correctly for small changes. If the amount of primary compensation applied as suction or pressure to the receiving compensation piston 66 can thus be balanced or averaged for large and small changes it is possible to control the transitory speed departures within small limits without undue hunting and, moreover, engines found to have peculiarities in responding to regulating impulses can be better regulated once the desired displaced volume adjustment (lever 75) and secondary compensation adjustment (needle valve 65) are determined and set.

Figures 3, 3A, 3B:
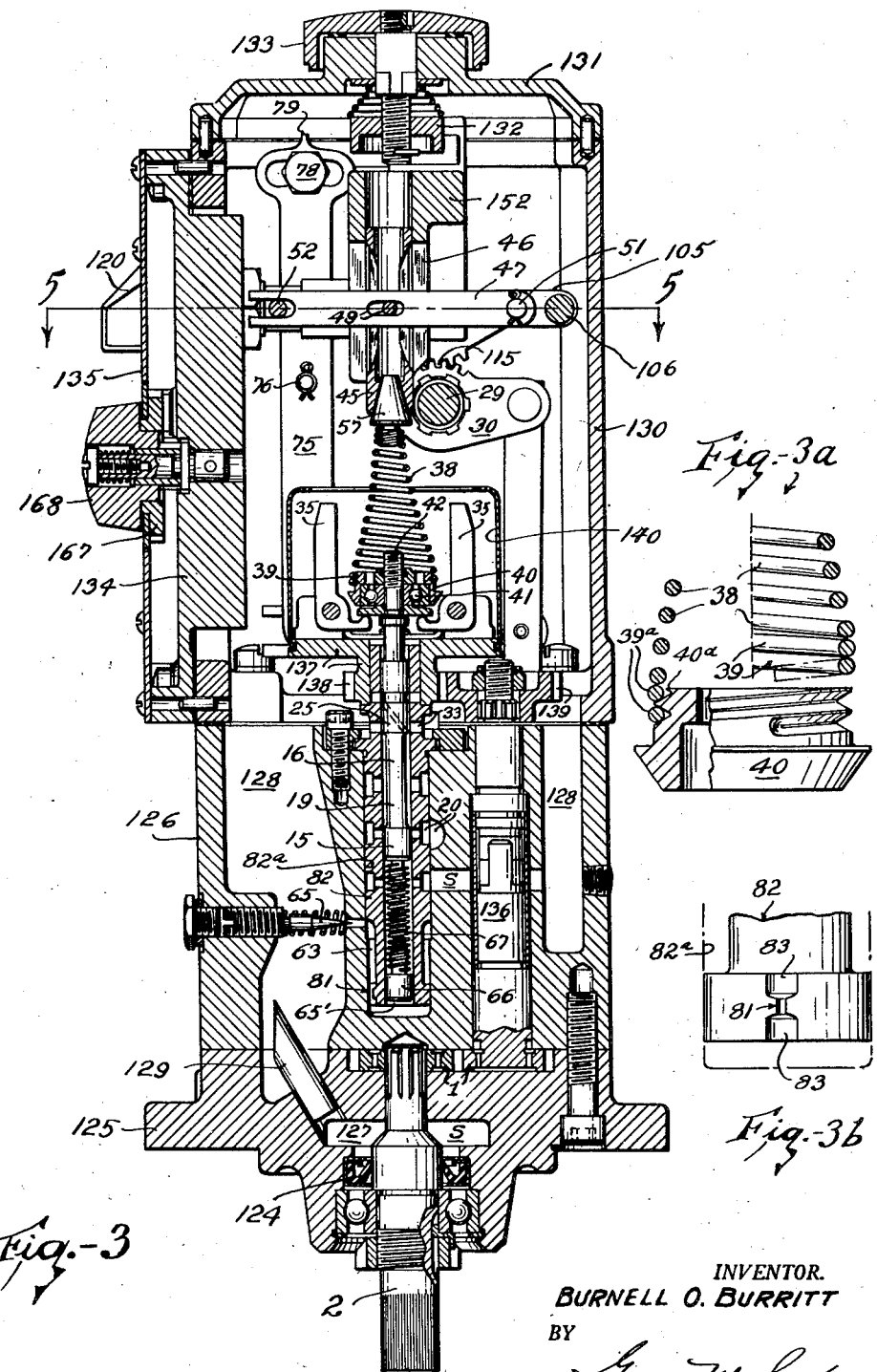
Fig. 3 is a vertical sectional assembly view of the entire governor mechanism cut as along the line 3—3 on Fig. 2.
Fig. 3a is a more or less diagrammatic sectional and elevational view of one end of a speeder spring shown prior to and after attachment to a supporting piece or perch.
Fig. 3b is an enlarged vertical detail elevational view taken at right angles to Fig. 3 and showing one form of compensation modifier.

In the showing of the compensation modifier according to Figs. 3 and 3b the adjustment, as by the screw 80, Fig. 1, is omitted, it being assumed that the proper size of aperture 81 for the class of engine the governor is to regulate has been predetermined or ascertained by trial. The pilot valve plunger 16 and the receiving compensation piston assembly 66, 67 occupy and operate in a fixed valve sleeve member 82 provided with various lateral ports communicating with portions of the various fluid ducts and fluid spaces as already described. The lower end of the sleeve 82 is fitted to a lower dead ended bore 82a separating the compensation fluid duct portion 63 from the lower end of the bore which is in open communication with the receiving compensation cylinder 65'. The aperture 81 is formed as a very small and short tube effect provided as an axial channel in the lower enlarged end portion of the valve sleeve. In order that the restriction will not offer too much frictional resistance to passage of compensation fluid therethrough the notch opens into enlarged channels formed similarly to the restriction 81 as at 83.

To provide adjustment a needle valve similar to the vent/inlet adjustment needle valve 65 might have its point formed generally complementary to the restriction channel at 81, aligned with the latter. The screw could be adjustable from outside the governor case or otherwise as desired.

The compensation modifier mechanism described above has been made the subject of B. O. Burritt application Serial No. 222,022, filed April 11, 1951.

Referring further to the regulation fluid duct arrangement, Fig. 1, which includes the valve bore 22, said bore is, in effect, normally open to both regulation fluid duct portions 20 and 23. However, it can be closed so as to limit the amount of regulation fluid that can be supplied for contact with the power piston 24 at certain regulating movements of the output shaft 29. For that purpose a valve plunger 85 occupies the bore 22 and seals the upper end of it as at 86 above a neck portion 87 of the plunger. The lower end of the plunger has a plug portion 88 normally sealing a discharge vent 89 leading to sump. The portion 86 serves as a plug to close the portion of the duct 20 at the intersection thereof with the bore 22. The plunger 85 is normally urged upwardly by a spring 90 acting upwardly on a head member 91 of the plunger and downwardly on a fixed part of the governor case.

Suitably guided as in a bore 92 of the case is an operating pin 93 for the valve plunger 85 and the pin, by abutment with the head 91, normally maintains a lever 94, pivotally connected as at 95 with the upper end of the pin 93, in an inactive position. The right hand end of the lever 94 is connected as by a link 96 with the regulator shaft operating arm 31. At the opposite end of the lever 94 but normally spaced therefrom is an abutment screw 97 which is arranged to contact with said opposite end of the lever during fuel increasing movements of the rock shaft 29 sufficient to depress the link 96 and swing the left hand end of the lever 94 against the abutment screw. The abutment screw can be operated for adjustment simply by means of a screw driver or other tool but preferably, in order to enable load limit adjustment from the outside of the governor, the screw is carried on a vertically adjustable rack 97 operable by a pinion 99 in mesh therewith. The operation of the load limit arrangement, depending upon the raised and lowered position of the screw 97, causes sufficient depression of the plunger 85 first to cut off the supply of regulating fluid by blocking the duct 20 and then immediately to vent the regulating fluid to the sump by virtue of the plug portion 88 of the plunger which plug portion acts to unseal the vent 89. When the vent is unsealed fluid escapes from the power cylinder 21, and, since constant pressure continues to be applied at the power cylinder 13 against the piston 14, the fuel increasing movement of the power lever 27 is not only checked but caused to be reversed until the vent 89 is again sealed. Consequently it is impossible for the servomotor to effect increase of fuel beyond the point at which the screw 97 causes such depression of the valve plunger 85.

In the operation of the load limit arrangement just described, it is always necessary to enable the fly balls to control regulating movement in the direction to decrease fuel, this being a safety factor in the event of sudden throwing off of load which might cause the engine to increase speed indefinitely. Such sudden decrease of load frequently occurs as a result of operation of a circuit breaker when the load on a generator line becomes excessive. To provide for that contingency a one-way operating valve, shown in the form of a ball check 101, is provided in a duct 102 which parallels the bore 22 or is in by-passing relation to the valve constituted by the plunger 85 and said bore.

The operation of the ball check is to enable discharge of fluid through the duct 20 or as normally determined by the position of the pilot valve plunger 16 whenever the plug portion 25 of the latter uncovers the port 33. In other words, the load limiting valve plunger 85 cannot, by becoming arrested in a position closing the duct 20 and also the vent 89, prevent discharge of regulating fluid from the cylinder 21 to sump by the pilot valve.

As mentioned above the speeder arm 47 can be raised and lowered at either end to adjust the compression of the speeder spring 38. The initial axial compression of the spring is, as mentioned above, the result of turning of the pinion 54 through appropriate mechanism. For speed droop adjustment of the speeder arm or lever 47 the pivot pin 51 is in the first place secured to an arm 105 which, in turn, is pivotally supported at its right hand end as on a pin 106 fixed to the governor case. Since the pin 51 on the lever 105 constitutes a pivotal support for the speeder arm 47 at the right of the speeder spring and plug assembly, the compression of the spring will be altered by swinging movement up or down of the left hand end of the lever 105. Said left hand end has a slot 107 slidably occupied by a pin 108. Said pin 108 in the actual physical construction extends through a speed droop adjusting element 109 so that one end of the pin 108 occupies the slot 107 in the lever 105 and the opposite end (shown for schematic illustration as though it were a separate pin 110 on Fig. 1) slidably occupies a slot 111 in a rocker lever 112 having a fixed pivot at 113 on the governor case. The rocker lever 112 has a gear driving connection constituted by mating gear teeth at 115 on said rocker lever 112 and the power lever assembly 27 respectively.

Movement of the regulator shaft 29 in the direction to increase fuel consequent upon slowing down of the engine due to increased load moves the rocker lever 112 in a counterclockwise direction. This action by virtue of the actual generally parallel side-by-side relationship of the slots 107 and 111 results in a raising movement of the lever 105 and hence, through the pin 51, a raising movement of the speeder arm 47. The action is, in effect, to slack off slightly and gradually on the speeder spring compression an amount proportionate to the fuel increasing movement of the terminal shaft by the rocker lever assembly 27. Thus when the engine speed tends to be restored to its original value after a "load on" change, the speed is not actually brought back to the original value because the effect of slacking off on the speeder spring is the same as though the operator had raised the left hand end of the speeder arm 47 by the speed setting mechanism 52, 54. This, as will be readily understood in this art, enables parallel connected engines, each having a governor such as described, to take their proportionate share of the load. Without such paralleling adjustment one engine only may assume or try to assume the entire load.

In the schematic arrangement (as distinguished from the actual construction which will be described later) the adjustment of the pin 108, 110 is shown as effected through the connecting block 109 by a rotary sleeve 117 having a screw slot 118 into which a pin 119 extends as from a suitable fixed part of the governor case. It will be apparent from inspection that when the sleeve 117 is turned in opposite directions as by the knob 120 the block 109 will be moved by the sleeve back and forth to carry the pin 108, 110 into different positions in the slots 107 and 111 and also that the farther the pin 108, 110 is moved to the right in the slot 111, the greater will be the lifting movement on the right hand end of the speeder arm through the intermediary of the supporting pin 51 and lever 105. In one position only of the pin 108, 110 with reference to the slot 111, namely when the pin position coincides with the position of the pivot 113 there is no slacking off of the speeder spring and the governor operates isochronously.

Referring now to Figs. 2 to 8, inclusive, enough of the actual design will be described or pointed out in detail to identify the parts as actually arranged with those of the schematic showing.

The drive shaft 2, Fig. 3, extends upwardly through an oil seal 124 and suitable bearings in an adapter or base 125. The shaft is splined for connection with one of the pump gears 1 located in a pump chamber recess in said base. A rigid power case 126 containing most of the fluid ducts and valve plungers is fastened to the adapter or base, and the latter may have formed therein a lower pump supply portion 127 of the sump. Said portion 127 receives fluid from upper sump space portions 128 in the power case as through a sludge obstructing tube 129.

A speeder case 130 surmounts the power case and has a readily detachable cover at 131 operated to attach it to and detach it from the speeder case by a latch bar 132 positioned by a knob 133 on the top side of the cover. One side wall of the speeder case is constituted by a separate wall section 134 supporting a control dial panel 135 adjacent which the adjusting knobs 120 and others are exposed in more or less conventional fashion.

Fig. 3 shows a convenient manner of driving the fly balls 35, constituting, as illustrated, a vertical sectional shaft 136 connected with the drive shaft 2 through one of the pump gears 1 and with a rotary head member or support 137 for the fly balls through mating gear elements 138 and 139 above the power case. The rotary head 137 is supported for rotation on an upper shouldered portion of the fixed valve sleeve 82. A ball head cover or guard for the rotary head 137, the fly balls and associated connections thereof with the pilot valve plunger 16 and speeder spring 38 is shown at 140.

Figure 4:
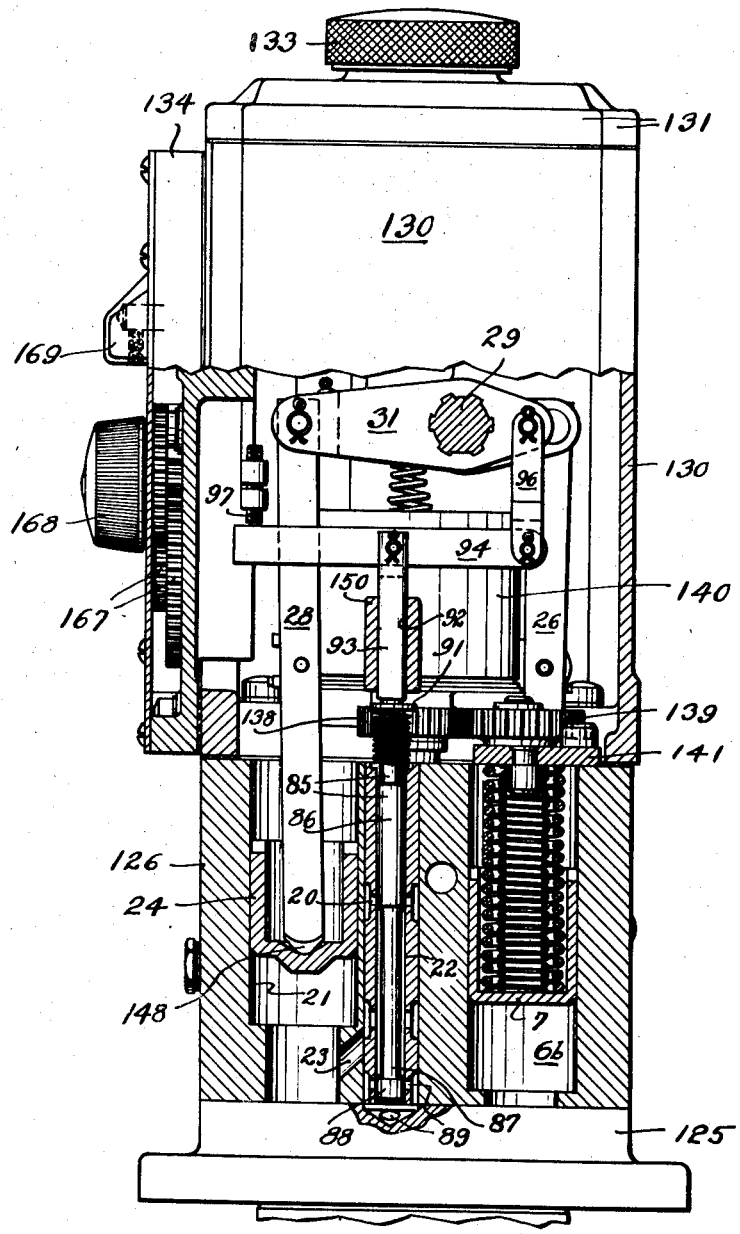
Fig. 4 is a sectional view similar to Fig. 3 taken as indicated at 4—4 on Figs. 2 and 8.
Figure 6:
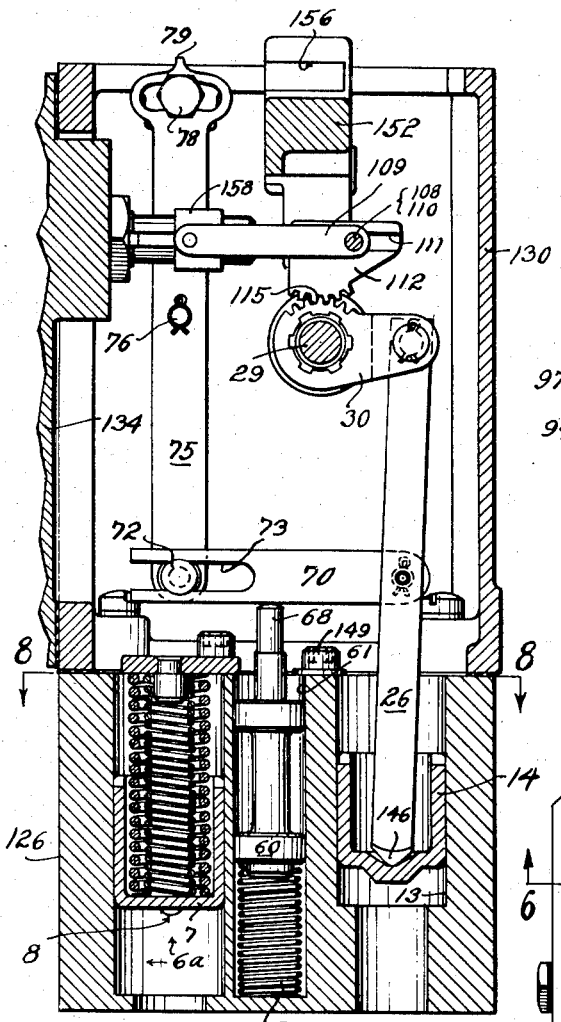
Fig. 6 is a view similar to Fig. 4 taken along the line 6—6 on Figs. 2 and 8.
Figure 8:
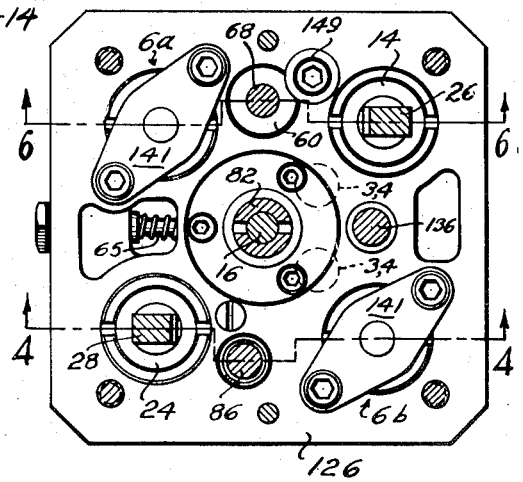
Fig. 8 is a plan view of a power case portion of the governor taken along the line 8—8 on Fig. 6.

The manner in which the plunger and cylinder assemblies of the regulating servomotor are disposed in respect to the rest of the mechanism is best shown in Figs. 4, 6 and 8. In the latter figure the servomotor pistons or plungers 14 and 24 are seen to be located at diagonally opposite corner regions of the power case 126, horizontally opposite respective unit portions 6a and 6b of the accumulator 6 which unit portions occupy the intermediate corner regions. Connecting fluid ducts for the accumulators and the supply ducts for the servomotor cylinders are or may be formed partly as channels cut into the matching faces of the power case 126 or the adapter 125 or formed as bores in one or the other of those main casing parts. The bores necessary to form the servomotor cylinders and the accumulator barrels are all open at the top of the power case, said barrels being provided with removable caps 141 against which the accumulator springs react upwardly. The location of the inlet and outlet valves 3, 4 of the pump system is generally indicated by broken lines on Fig. 8 only. The pistons or plungers 14 and 24 can be readily removed from their cylinders when the power case is removed from the speeder case.

It will be noted in Figs. 4 and 6 that the links or push rods 26 and 28 have their lower ends formed as blunt points 146 and 148 which are self-centering into receiving sockets in the respective piston or plunger members, which sockets are formed with sides which converge downwardly less steeply than the surfaces forming the blunt points of the push rods. The push rods, connecting rock arms attached to the terminal shaft 29 and the levers operatively connected to the push rods constitute with the speeder case a complete sub-assembly which is removable as a unit with the speeder case.

Each of the levers 30 and 31 as clearly shown in Figs. 1, 4 and 6 is individually keyed to the terminal shaft 29 through non-circular openings in the levers approximately fitting a single common type of spline formation on the shaft. Assuming that the spline connections are not sufficiently tight so as to interfere with easy assembly and disassembly of the shaft with respect to the speeder case through the non-circular openings there would then be enough circumferential clearance between the spline faces to permit relative angular rocking movement between each lever and the shaft, hence between the servo motor pistons and the fuel regulating (e. g. rack mechanism) connections with the engine served by the governor. In the present construction such easy spline fitting and angular relative movement of parts mentioned as well as looseness, hence freedom of movement in the pivot pin connections between the levers and push rods 26 and 28, are of no consequence because, during operation of the governor, positive fluid pressure is always maintained in the cylinder spaces 13 and 21 taking up the spline and other clearance and insuring at all times that the slightest regulating movement on part of the pistons 14 and 24 will or can be communicated to the fuel regulating mechanism of the engine. The construction thus avoids the use of expensive clamping, anti-backlash locking devices and tight fits usually found necessary in connecting a single power piston to the terminal shaft or operatively similar part which devices invariably complicate assembly and disassembly of the associated governor mechanisms and usually result in waste of power.

The actuating compensation piston assembly 60, 69 etc. is located between the power piston 14 and accumulator unit 6a and the load limit valve plunger 86 and associated valve mechanism between the power piston 24 and accumulator unit 6b. A retainer screw 149 for holding the actuating compensating piston 60 from being ejected from its cylinder by the spring 69, when the speeder case assembly is removed from the power case, is attached to the power case in slightly overhanging relation to the bore for said piston 60. The guide 150 (Fig. 4) for the operating rod 93 of the load limit mechanism is a bracket portion or part of the speeder case assembly. The pivot 76 and locking screw 78 for the compensation stroke adjustment lever mechanism 70, 75 etc. are carried by a vertical wall of the speeder case as evident from comparison of Figs. 2, 3 and 6.

Figure 2:
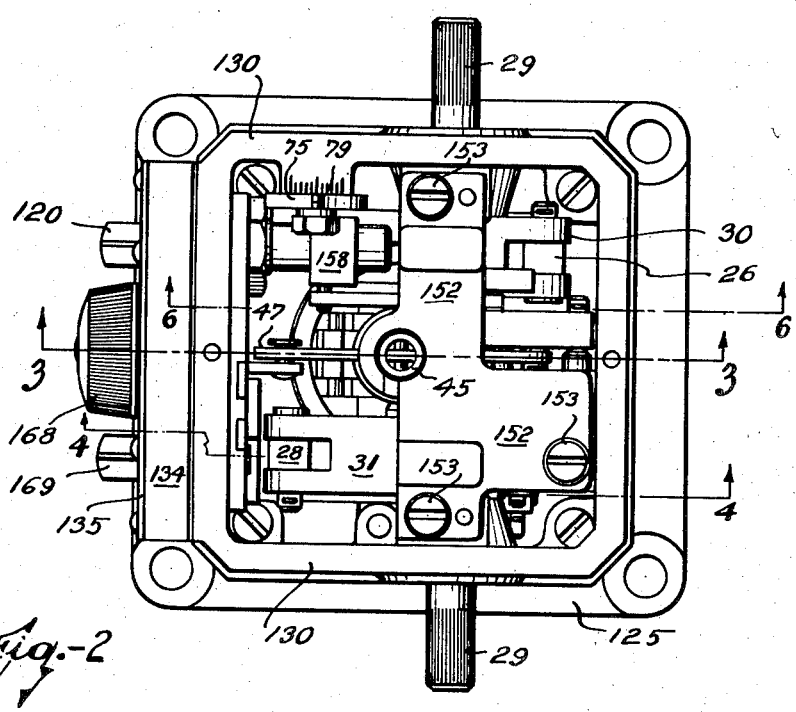
Fig. 2 is a plan view of a speeder case portion of the governor with a cover portion thereof removed.

Referring again to the speed adjustment and speed droop lever mechanisms, upper speeder spring guide etc. the same are carried principally by a bridge element or member 152 of the speeder case 130 removably attached to mutually integral side walls of the speeder case as by screws 153, Fig. 2, entering horizontal ear formations on said walls. A more or less central depending part of the bridge constitutes the guide 46 for the speeder plug 45, already described; and depending bracket portions 154 and 155 of the bridge support the pivot pins 106 and 113 of the speeder lever mechanism (part 105) and servo-motor-actuated rocker lever 112 respectively. The ends of the locking bar 132 of the detachable cover 131 seat in notches in end portions of the bridge 152, one such notch being shown at 156, Fig. 6.

Figure 5:
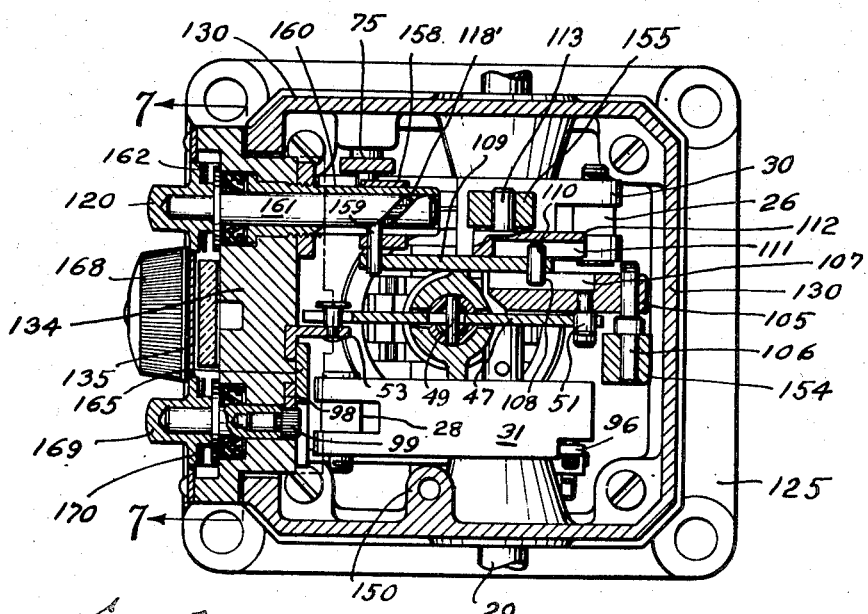
Fig. 5 is a horizontal sectional view taken substantially along the line 5—5 on Fig. 3.

In the speed droop and isochronous operation adjustment mechanism as exhibited particularly by Fig. 5, it is noted that the rocker lever 112 and the speeder lever supporting lever 105 which are oppositely and longitudinally grooved or slotted at 111 and 107 respectively for the pin 108, 110 are normally side-by-side in the same horizontal plane, being on opposite sides of the speed droop adjusting member 109 which carries said pin. The adjusting member extends toward the dial panel adjacent a ring 158 which carries a pin 159 radially of the ring and one end of which is connected to the adjusting member 109. The ring rides on a fixed tube 160 carried by the wall section 134 and which forms a guide for a rotatable but axially fixed shaft 161 connected to the speed droop adjusting knob 120. The shaft 161 has a spiral slot 118' (cf. spiral slot 118, Fig. 1) and the pin 159 extends from the sliding ring 158 into the spiral slot so that turning of the knob 120 effects endwise adjustment of the adjusting member 109 hence the cross pin 108, 110.

It should be noted that because the cross pin 108, 110 connects with the speed adjusting lever through the intermediary of the fixedly pivoted lever 105 on which the right hand pivot 51 of the speed adjusting lever 47 is carried, the latter lever as swung for speed droop operation has a much less movement up and down, particularly at low speed droop departure adjustment, than if the right hand end of the lever 47 were slotted for engagement by the pin end 108 in the manner in which the slot 107 is engaged by said pin end. A very slight movement of the pin 108, 110 off center with respect to the fixed pivot 113 for the lever 112 would slack off too much on the speeder spring and in the higher departure (or speed droop percentage) adjustments disproportionately small adjustment increments would result from given fractional turns of the knob 120. A detent spring 162 secured to the speeder case wall section 134 engages an adjacent enlarged disc portion of the shaft 161 (or the inner face of the knob 120) to prevent the speed droop setting from being disturbed by engine vibration.

Figure 7:
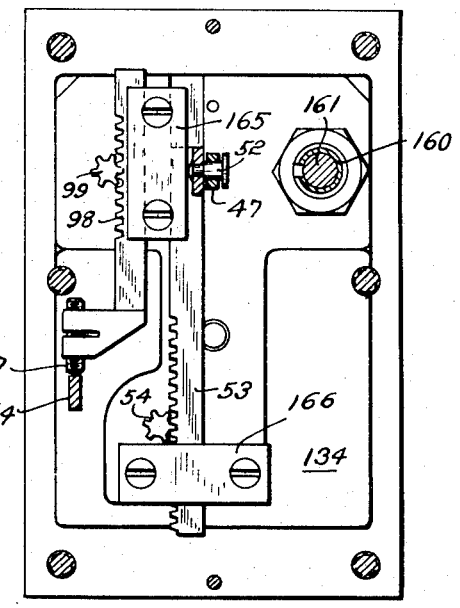
Fig. 7 is a detail view taken as along the line 7—7 on Fig. 5 showing portions of speed setting and load limit adjustment mechanism.

As exhibited by Figs. 4, 5 and 7, the racks 53 and 98 which are adjusted by the pinions 54 and 99 for changing speed and adjusting the load limit mechanism are mounted side by side on the speeder case section 134 in appropriate grooves or channels in said section. The racks are both held in place by a plate 165 near their top ends, the lower end of the rack 53 being additionally retained by a plate 166. The speed adjusting pinion 54 is connected through gearing 167 including a back geared vernier dial (not shown) to a speed adjusting knob 168. The load limit adjusting pinion 99 is directly connected to a knob 169. Both knobs are similarly associated with the dial panel. A detent spring for the knob 169, or its shaft, is shown at 170.

Referring again to Figs. 3 and 3a, the usual method of attaching a coiled speeder spring to a supporting piece or perch such as 40 associated with the pilot valve is to form coarse threads on the perch and to screw one or more end turns of the coil spring onto the threads. If even one of the end coils of the spring is slightly undersized in respect to the supporting threads the connection so made is self-locking and ordinarily precludes likelihood of movement of the spring out of place on the perch. With the view to enhancing the gripping hold of the spring terminal coil or coils on the threads of the perch the coils have, I believe, always been so made that the pitch of the spring end coils is greater than the pitch of the screw threads, at least never less or more closely spaced than adjacent threads. The result has been that when the threads are formed in the usual way leaving an incomplete thread where the thread cutting begins or "runs" out, a condition occasionally occurs at low speed settings by which the speed changes abruptly from low to very low. This is due to a coil, which at higher speed settings abuts a partially formed or "low" thread at one side and a completely formed thread at the other, jumping out of place over the incompletely formed thread as the stress in the spring is relieved. If the terminal coils 29, or at least as many of the coils as there are perch threads to receive said coils, are wound more closely than the pitch of the screw threads, or tight together as exhibited at the right Fig. 3a, the coils when threaded onto the perch threads as at 39a (left Fig. 3a) will be forced apart rather than toward each other. If the thread groove on the perch extends twice around the perch then the end of the spring to be associated with said groove is preferably wound with three complete turns closely adjacent each other or in mutual contact as indicated.

The result of the construction described by the next preceding paragraph is that regardless of malformation of the last portion of the screw thread on the perch, as suggested at 40a (left Fig. 3a), there is never any tendency for a coil to jump over such low or malformed thread because no amount of slacking off on axial compression of the spring can pull the last engaged terminal coil away from the next engaged coil because the former is already stressed in that same axial direction. The arrangement results in a considerable saving in cost of threading the perches because the manufacturer does not have to make certain of providing only perfect threads and what is more important said arrangement results in being certain of being able to adjust at all speeds in gradual increments.

I claim:

1. In a hydraulic relay governor, a fluid pressure source, a pilot valve and duct means controlled thereby to render the source operative to move a fuel regulating servomotor in opposite directions to increase and decrease fuel input to a machine to be governed, a second valve in the duct means and movable to interrupt the supply of pressure fluid to the servomotor in the manner required to move the servomotor in the fuel-input-increasing direction, a lever, a point on which is connected to the servomotor for movement of the lever thereby, another point on the lever being operatingly connected to the second valve for operation of that valve, a settable device operatingly connected to the lever at a third point thereon to render the lever operative to move the second valve to its fluid interrupting position when the servomotor has moved in the fuel increasing direction a distance determined by the positioning of the settable device, and a one way acting relief valve in said duct means in by-passing relation to the second valve for enabling the pilot valve to cause fuel-decreasing operation of the servomotor during such supply fluid interruption by the second valve.

2. In a hydraulic relay governor, a pilot valve, a hydraulic servomotor controlled by the valve and comprising two cylinders of closely similar or identical diameters and respective pistons slidable therein, said pilot valve being arranged for control of approximately constant pressure fluid to route it to one cylinder for movement of the servomotor in one direction and to vent the fluid from the other cylinder for movement of the servomotor in the opposite direction, a rotary regulating shaft and means including separate lever arms of unequal length individually connecting the pistons respectively to the shaft whereby to exert torque thereon continually in opposite directions during all movements of the pistons.

3. In a hydraulic relay governor having a pilot valve and double acting differential type servomotor controlled by the valve and constituted by two approximately identical diameter pistons in generally parallel cylinders in a common casing unit, an oscillatory regulator shaft journalled in a casing unit separable from the first mentioned unit but normally attached thereto, linkage including unequal length lever arms separately connected with the regulating shaft and push rods pivotally connected to respective lever arms and having one-way-acting self-centering abutment connections with the respective pistons for imparting thrust from the respective pistons to the lever arms, whereby removal of the casing unit supporting the shaft and linkage will effect disconnection of the shaft and linkage from the pistons and replacement can effect reconnection.

BURNELL O. BURRITT.

REFERENCES CITED

The following references are of record in the file of this patent:

UNITED STATES PATENTS

| Number | Name | Date |
|---|---|---|
| 474,064 | Piccard | May 3, 1892 |
| 882,887 | Hoxie | Mar. 24, 1908 |
| 1,476,703 | Forman | Dec. 11, 1923 |
| 1,890,041 | McLeod | Dec. 6, 1932 |
| 1,976,820 | Wettstein | Oct. 16, 1934 |
| 2,197,743 | Crafts et al. | Apr. 16, 1940 |
| 2,224,321 | Schwendner | Dec. 10, 1940 |
| 2,229,681 | Sorensen | Jan. 28, 1941 |
| 2,239,602 | Gottlieb | Apr. 22, 1941 |
| 2,252,838 | Drake et al. | Aug. 19, 1941 |
| 2,292,194 | Blymyer | Aug. 4, 1942 |
| 2,314,841 | Crafts | Mar. 23, 1943 |
| 2,324,516 | Kalin | July 20, 1943 |
| 2,341,384 | Kalin | Feb. 8, 1944 |
| 2,344,308 | Kalin | Mar. 14, 1944 |
| 2,364,817 | Reggio | Dec. 12, 1944 |
| 2,371,793 | Bourland | Mar. 20, 1945 |